United States Patent
Cardinali Ieda

(10) Patent No.: US 6,772,959 B2
(45) Date of Patent: Aug. 10, 2004

(54) CONSTRUCTIVE ARRANGEMENT APPLIED TO AN INTEGRATED THERMOSTATIC VALVE ATTACHED TO ITS OWN HOUSING

(75) Inventor: João José Cardinali Ieda, Vila Independencia (BR)

(73) Assignee: Wahler Metalurgica Ltda, Piracicaba (BR)

( * ) Notice: Subject to any disclaimer, the term of this patent is extended or adjusted under 35 U.S.C. 154(b) by 0 days.

(21) Appl. No.: 10/600,824

(22) Filed: Jun. 20, 2003

(65) Prior Publication Data

US 2004/0007629 A1 Jan. 15, 2004

(30) Foreign Application Priority Data

Jun. 21, 2002 (BR) ............................. 8201940 U

(51) Int. Cl.[7] ............................................. F01P 7/16
(52) U.S. Cl. .................................................. 236/34.5
(58) Field of Search .............................. 236/34, 34.5

(56) References Cited

U.S. PATENT DOCUMENTS

| | | | | |
|---|---|---|---|---|
| 3,365,130 A | * | 1/1968 | Kamin ....................... | 236/34.5 |
| 3,817,450 A | * | 6/1974 | Mischke .................... | 236/34.5 |
| 4,456,167 A | * | 6/1984 | Buter ........................ | 236/34.5 |
| 4,883,225 A | * | 11/1989 | Kitchens ................... | 236/34.5 |
| 5,129,577 A | * | 7/1992 | Kuze ......................... | 236/34.5 |
| 5,690,276 A | * | 11/1997 | Thiel et al. ................ | 236/34.5 |
| 5,979,778 A | * | 11/1999 | Saur .......................... | 236/34.5 |
| 6,138,617 A | * | 10/2000 | Kuze ......................... | 123/41.1 |
| 6,439,467 B2 | * | 8/2002 | Mabboux et al. .......... | 236/34.5 |
| 6,592,046 B2 | * | 7/2003 | Suda ......................... | 236/34.5 |

* cited by examiner

*Primary Examiner*—William E. Tapolcai
(74) *Attorney, Agent, or Firm*—William J. Sapone; Coleman Sudol Sapone, P.C.

(57) ABSTRACT

A constructive arrangement applied to an integrated thermostatic valve attached to its own housing has a hollow tubular-shaped body (1) projecting from a flange (2) with holes (3) for fixing screws, and a central opening (4) that determines the chamber mouth molded to the cavity of the body. There are two opposing lengthwise projections (6), which have a groove (7) near the chamber mouth, and another groove (8) near the mouth of the body (1), with the ends of a curved plate (9) fitted into the grooves (8). In the grooves (7) are fitted the ends of another plate (11). A sheet metal disk (12) is inserted into the internal rim of the mouth (4) of the chamber (5), having fixed to the end of the thermostatic valve, a washer (14) for supporting the disk (15) that has a hole where the terminal of the aforementioned thermostatic valve is housed and moves. This disk (15) is subject to the action of a conical spring (16), and has near the top of the thermostatic valve a groove, in which a ring (18) is fitted, under which a plate (19) is fixed that supports a conical spring (20), and between the upper (9) and lower (11) plates there is a helical pressure spring (21), and to the side of the chamber mouth there is a circular groove (22) for housing a sealing ring.

1 Claim, 2 Drawing Sheets

CORTE A-A

CORTE B-B

US 6,772,959 B2

CONSTRUCTIVE ARRANGEMENT APPLIED TO AN INTEGRATED THERMOSTATIC VALVE ATTACHED TO ITS OWN HOUSING

TECHNICAL FIELD

This invention relates to a thermostatic valve for controlling water flow.

BACKGROUND

This patent application deals with a constructive arrangement as applied to an integrated thermostatic valve device attached to its housing, with an innovative conception, and providing significant technological and functional improvements, in accordance with the most modern concepts of automotive engineering, and in accordance with the required norms and specifications, which give it its own characteristics and the fundamental requisite of novelty, thereby resulting in a series of real and extraordinary technical, practical and economic advantages.

Previously thermostatic valves were attached to the housing which was after fixed to the engine, and only then did they receive the lid coupling, such procedures resulting in more labor, loss of time and an increase in operational and production costs. Assembly was more complex, demanded more time and labor, as well as increasing the manufacturing costs. It also demanded special attention so that the necessary precision relative to the assembly of the thermostat on the housing was achieved, although on many occasions this was not achieved, and consequently this had a negative influence on the functioning of the device, which left a lot to be desired as far as the quality of the final product and the guarantee that it would work well were concerned.

Over time, studies were carried out which sought to eliminate these problems and inconveniences and as a result, a technique was developed that permitted a new constructive arrangement for the thermostat to be conceived, out of which grew the possibility of integrating the thermostatic valve with its own housing, thereby obtaining an single product with real possibilities for arriving at an economic manufacturing process, by minimizing costs, assembly time and labor expenses, as well as having a much needed effect on assembly, leading to better results and a high level of safety.

From the way in which this integrated device was conceived, it was possible to drastically reduce its dimensions and consequently the amount of material used, thereby improving the cost/benefit relationship in relation to the value needed to increase the assembly, allowing for maximum facilitation when it came to attaching it to the engine.

This design allowed for parts (housing and lid) to be conceived with the appropriate shape and ideal placement to meet all the functional and installation needs. The re-dimensioning of these parts to fit conventional housings allowed interfaces with all other connecting parts, such as hoses and the engine, to be respected, thereby taking advantage of the spaces of the other attachment components.

The integrated device also offered real possibilities for economies in manufacturing and a significant reduction in labor costs, because it provided a very accurate way of assembling the thermostatic valve, in such a way as to get the best results, the best operating conditions of the engine, the best finish on the final product and competent engineering.

SUMMARY OF THE INVENTION

In general terms, the thermostatic valve is made up of a working element or temperature sensor, a bridge that supports the whole device, a helical spring that is located between the supporting bridge and a side rim attached to the aforementioned temperature sensor that determines the amount of obstruction and controls the flow of cooling liquid, and a pin for centralizing the assembly, located on the upper surface of the working element or temperature sensor.

In order to achieve the integration of the thermostatic valve with the housing, the latter was provided with two legs fitted at right angles, on the facing surfaces of which there is a recess, into which the ends of the supporting bridge are slotted in such a way as to lock. The centralization of the thermostatic valve is achieved by placing the centralizing pin in a small slot in an internal projection of the housing, thereby fixing the whole of the thermostat device and joining it to the housing as a whole.

The innovation proposed has to do with a thermostatic valve attached to its housing using a new constructive arrangement, which has been conceived with important technological and functional improvements, more particularly with regard to the attaching procedure, which is done differently from the way described for the integrated devices mentioned above, and which have been the object of various patents both requested by and granted to the present petitioner. With this particular innovation the two legs at right angles are removed from the housing where the supporting bridge and whole of the thermostatic valve device are attached, which in addition to other technical, practical and functional advantages, as well as giving the product more robustness, which is ideal for achieving its operational and installation needs, improves the cost/benefit factor and provides economical solutions (construction simplicity—a single device), greater physical free space, simple maintenance and thermodynamics.

BRIEF DESCRIPTION OF THE DRAWINGS

To obtain a clearer picture of the new construction technique used in the integrated thermostatic valve device in question drawings are attached, to which reference is made in order to better illustrate the following detailed description.

DETAILED DESCRIPTION OF THE INVENTION

Figure 1:
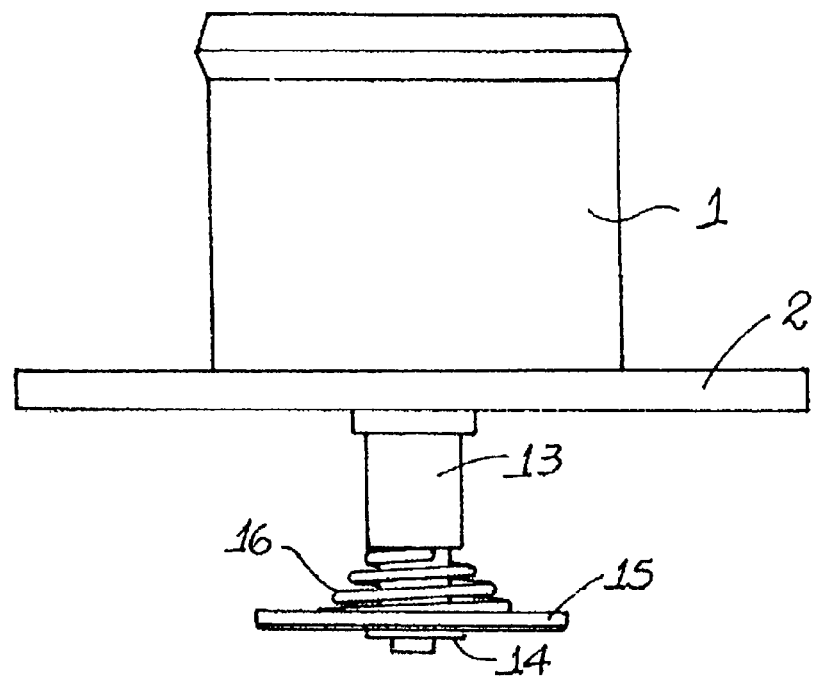
FIG. 1: Shows a side view of the thermostatic device attached to its housing with its new construction design.
Figure 2:
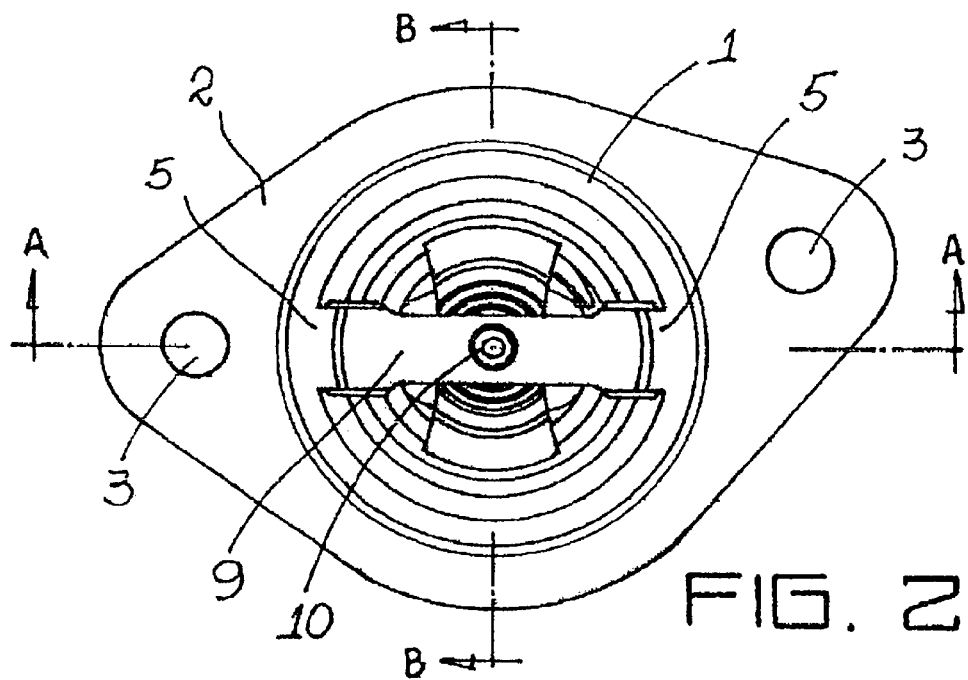
FIG. 2: Shows the view from above.
Figure 3:
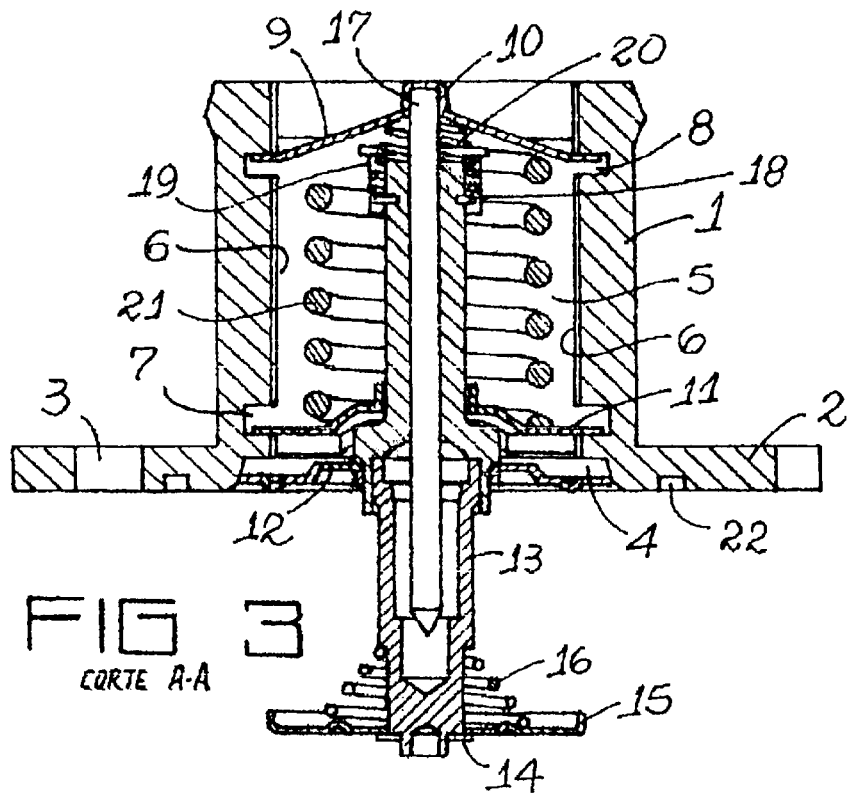
FIG. 3: Shows a lengthwise sectional view along a plane indicated by the A—A line in the previous figure.
Figure 4:
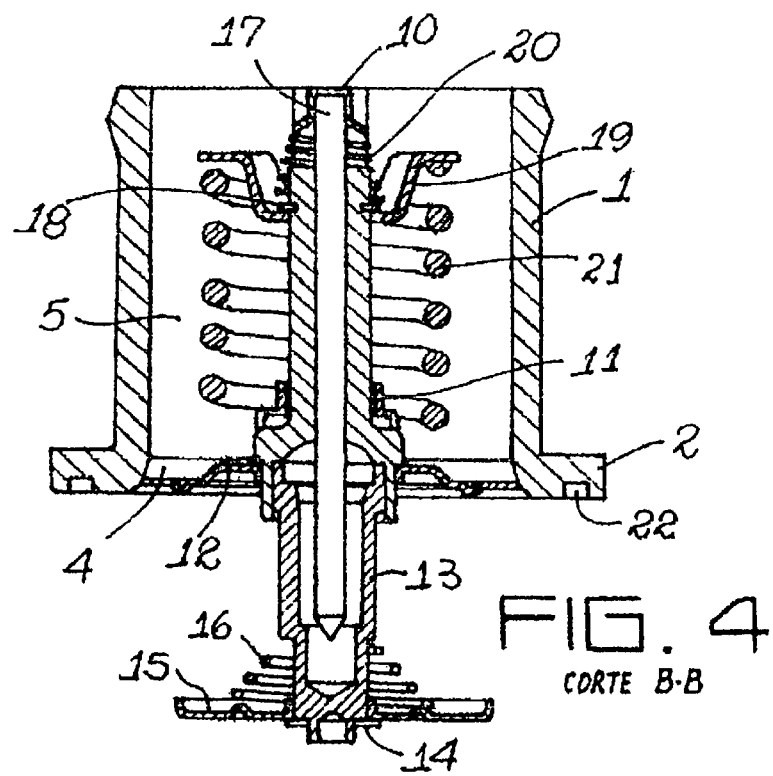
FIG. 4: Shows a cross section view along a plane indicated by the B—B line in FIG. 2.

In accordance with these illustrations and their details, the new constructive device applied to the thermostatic valve attached to its housing, as here set out, is essentially characterized by having a hollowed tube-shaped body (1), projecting from a flange (2) with holes (3) that take the screws that are used for fixing it to the engine housing with a central opening (4), which determines the mouth of the chamber (5) molded to the cavity of the aforementioned tubular body (1) in which, on two diametrically opposed sides, there are two lengthwise projections (6), each with a groove (7) next to the mouth of the chamber and another groove (8) near the opening to the body (1).

Slotted into the grooves (8), near the opening of the body, are the ends of a curved, stamped metal sheet (9) in the form of a very open "V", at the apex of which there is a protuberance in the shape of an upside down cup (10).

In the grooves (7), near the chamber mouth, the ends of another stamped metal sheet (11) are fixed, having a raised central sector and a hole with a turned edge.

A stamped metal disk (12), with a central hole and a turned edge, is inserted into and fixed to the internal rim of the mouth (4) of the chamber (5).

The thermostatic valve is shown here merely as an example of how it is used and assembled. The thermostatic value is an integral part of the housing, in such a way that the working element or temperature sensor (13) is fixed underneath, between the central hole in the disk (12) that is inserted into the mouth of the chamber and that projects outside it, where a washer (14), fixed to one extremity, supports a stamped metal disk with a turned edge (15) that has a central hole that houses, and through which, the terminal of the aforementioned working element of the thermostatic valve moves. The disk (15) suffers the action of a conical spring (16), which is supported on a ledge formed in the body of the temperature sensor because of diameter differences.

An extension of the thermostatic valve projects into the chamber (5), having on its end a centralization pin (17), which is fitted into the upside down cup shaped protuberance (10), which forms part of the apex of the stamped metal sheet (9). A slot runs all the way around the thermostatic valve near the top and in this a ring (18) is fixed, beneath which is fixed a "U" shaped stamped metal sheet (19), which serves as a support for a conical spring (20), which, at its other extremity, comes up under the stamped metal sheet (9).

Between the upper (9) and lower (11) stamped metal sheets, there is a helical pressure spring (21).

To the side of the chamber mouth there is a circular groove (22), where the sealing ring is housed.

This is therefore a very important product for the purpose for which it was designed, which consists in a new way of obtaining an integrated device, by combining in one single part the thermostatic valve and its respective housing for attaching to the engine, thereby fully satisfying the proposed aims and accomplishing in a practical and efficient manner and the functions it was meant to perform, providing a series of advantages that are inherent to its application, having its own innovative characteristics.

While preferred embodiments of the present invention have been shown and described, it will be understood that various changes or modifications may be made without varying from the present invention.

What is claimed is:

1. An integrated thermostatic valve attached to its own housing comprising a hollow, tubular body (1) projecting from a flange (2) with holes (3) used to accept screws for fixing to an engine housing and having a central opening (4) that defines the mouth of a chamber (5) molded to the cavity of the tubular body (1), and having on two diametrically opposed sides, two lengthwise projections (6), which have a first groove (7) next to the chamber mouth and a second groove (8) near the opening of the body (1) and having fitted into the second grooves (8) the ends of a first, "V" shaped curved metal sheet, on the apex of which is a protuberance in the shape of an upside down cup (10); and having fitted into the first groove (7) the ends of second metal sheet (11), which has a raised central sector with a hole with a turned edge; and having a first sheet metal disk (12) with a central hole with a turned edge that is fitted by its rim to the edge of the mouth (4) of the chamber (5); the thermostatic valve integrated into its own housing with a working element or temperature sensor (13), fixed between the central hole in the disk (12) and projecting beyond the housing where, on its end, a washer (14) is fixed for supporting a second sheet metal disk with its turned edge (15) that has a central hole where the terminal of the working element of the thermostatic valve is fixed and moves, the second disk (15) being subject to the action of a conical spring (16), supported on its other side by a ridge in the body of the temperature sensor formed by a difference in diameters; and an extension of the thermostatic valve projecting into the interior of the chamber (5) and having a centralizing pin fitted to the upside down cup-shaped protuberance (10); and having near the top of the thermostatic valve a slot that runs all the way around it, and in which a ring (18) is attached, underneath which a "U" shaped stamped metal sheet is fixed (19), which supports a conical spring (20), which on the other side comes up under the first metal sheet (9); and having, between the first (9) and second (1) stamped metal sheets, a helical pressure spring (21); and having on the edge of the chamber mouth a circular groove (22) where the sealing ring is fitted.

* * * * *